Figure 1:
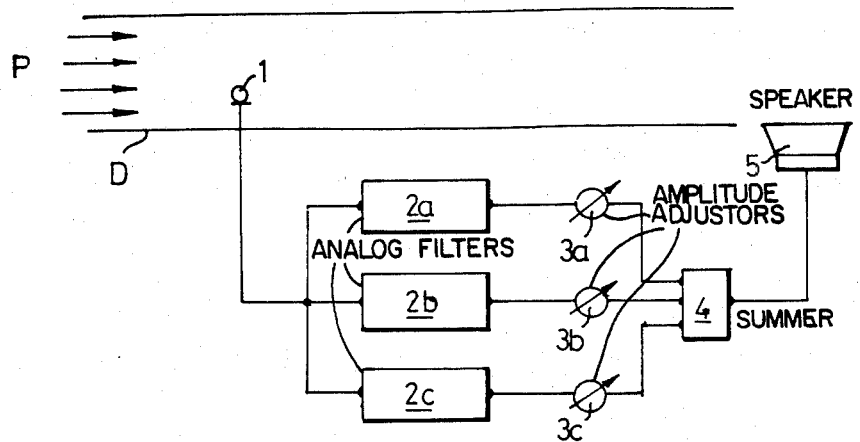

United States Patent [19]

Chaplin et al.

[11] Patent Number: 4,490,841
[45] Date of Patent: Dec. 25, 1984

[54] METHOD AND APPARATUS FOR CANCELLING VIBRATIONS

[75] Inventors: George B. B. Chaplin; Roderick A. Smith, both of Colchester, England

[73] Assignee: Sound Attenuators Limited, Colchester, England

[21] Appl. No.: 518,802

[22] PCT Filed: Oct. 21, 1982

[86] PCT No.: PCT/GB82/00299
§ 371 Date: Jun. 17, 1983
§ 102(e) Date: Jun. 17, 1983

[87] PCT Pub. No.: WO83/01525
PCT Pub. Date: Apr. 28, 1983

[30] Foreign Application Priority Data

Oct. 21, 1981 [GB] United Kingdom ............... 8131674

[51] Int. Cl.³ ............................................. G10K 11/16
[52] U.S. Cl. ........................................ 381/71; 381/94
[58] Field of Search ...................... 381/71, 94, 56, 57

[56] References Cited

U.S. PATENT DOCUMENTS 3,662,108 5/1972 Flanagan .
4,066,842 1/1978 Allen ................................... 381/71

FOREIGN PATENT DOCUMENTS 0043565 1/1982 European Pat. Off. .
WO81/00638 3/1981 PCT Int'l Appl. .
2054999 2/1981 United Kingdom .
2097629 11/1982 United Kingdom .

OTHER PUBLICATIONS

Journal of the Acoustical Society of America, vol. 70, No. 3, Sep. 1981, (New York, US), Burgess: "Active Adaptive Sound Control in a Duct: A Computer Simulation.

*Primary Examiner*—Stafford D. Schreyer
*Assistant Examiner*—James L. Dwyer
*Attorney, Agent, or Firm*—Dann, Dorfman, Herrell and Skillman

[57] ABSTRACT

Methods and apparatus for cancelling both random and repetitive vibrations in gases, liquids or solids. The invention relies on generating cancelling vibrations (S) for a primary vibration to be nulled (P) by operating at discrete locations in the frequency domain of time samples of the waveform of the primary vibration. The cancelling vibrations required are generated by transforming (at 15) the sensed residual vibrations into a plurality of pairs of components which together define the residual vibrations at a plurality of different locations in the frequency domain, separately modifying (at 17) the independent components and then transforming (at 20) the modified components back into a drive signal for the source (12) of the cancelling vibrations.

7 Claims, 6 Drawing Figures

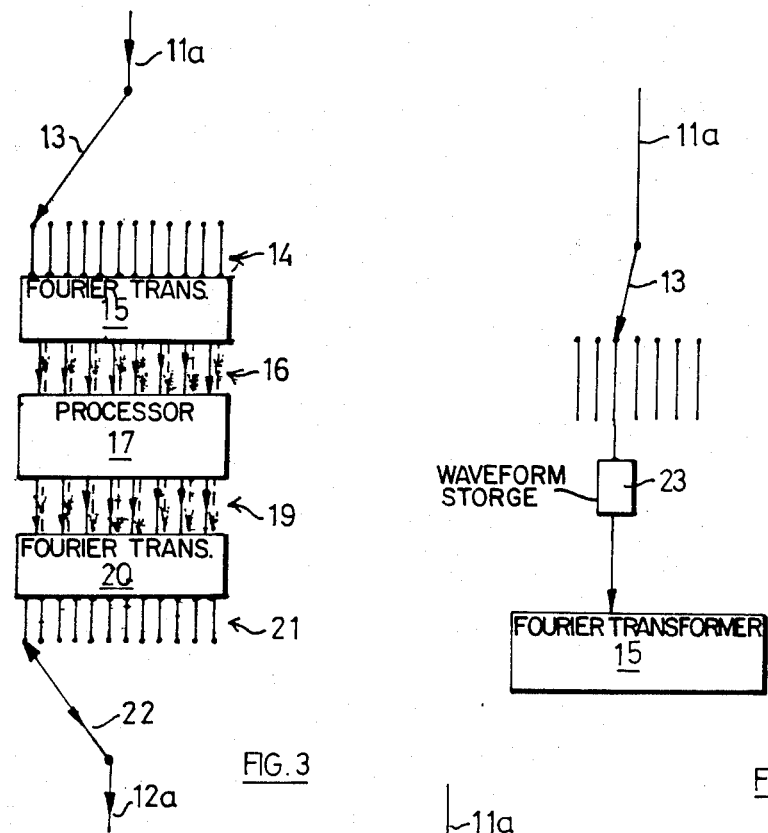
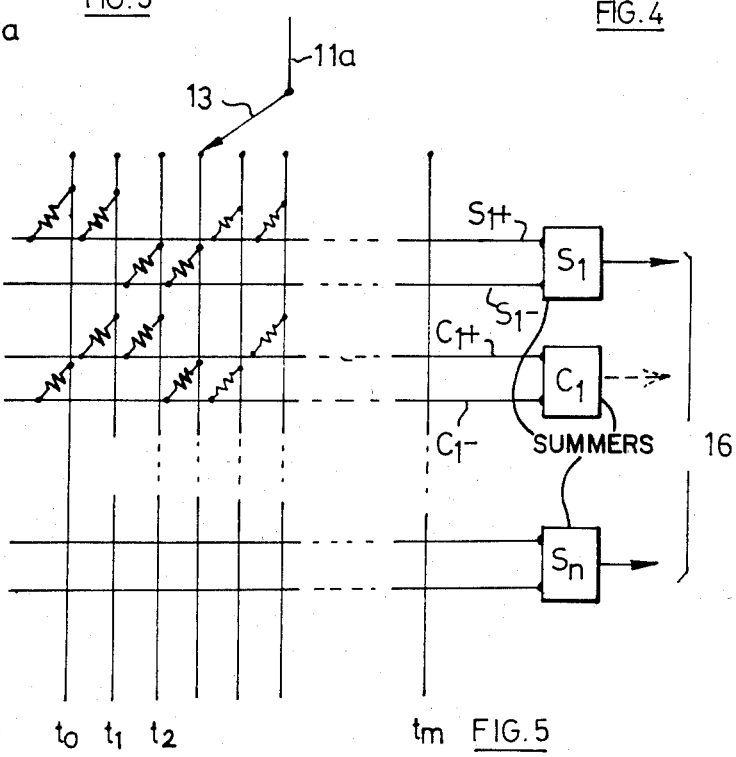
FIG. 3  FIG. 4
FIG. 5

METHOD AND APPARATUS FOR CANCELLING VIBRATIONS

The invention relates to an improved method for cancelling vibrations (which may be gas-, liquid- or solid-borne) by nulling primary vibrations, at least in part, with specially generated cancelling or secondary vibrations. The invention also extends to vibration nulling apparatus based on the said improved method.

The invention can be applied equally to the cancellation of repetitive vibrations or random vibrations.

Earlier vibration cancellation methods used direct feedback from a residual vibration sensor, influenced by both the primary and secondary vibrations, which acted both to sense the uncancelled vibrations and to provide a null point for a negative feedback system. These known methods were quite limited in applicability because they provided only local cancellation in a region where the vibration field might be changing rapidly with position. The residual sensor could not be moved to a more uniform vibration (e.g. sound) field, because the additional delay thereby introduced into the feedback system would cause instability in the feedback loop, or an unacceptably poor cancellation performance.

It has also been proposed (see UK Application No. 1,577,322), that where the primary vibrations are of a repetitive nature, the waveform of the required cancelling, or secondary vibrations can be synthesised from waveform elements synchronised with the repeat cycle of the primary vibrations. The most important feature of such a repetitive cancelling method is that by generating a synchronised waveform for cancellation, the feedback can be applied on the *following* repeat cycle, thus providing a capability to compensate for the inherent acoustic delay. Heretofor a time domain approach has been used for adjusting waveform elements of the secondary vibrations to minimise the power or the waveform of the residual vibrations at the null point.

In cases where the response from the source of the secondary vibrations (cancelling actuator) to the residual vibration sensor is particularly difficult (in terms of its phase response) considerable advantages can be gained by using a frequency domain approach. Earlier attempts to do this (see FIG. 1 of the accompanying drawings) involved separating the measured output of a residual sensor 1 into a number of frequency bands using frequency domain analogue fulters 2a, 2b, 2c (etc.), correcting the amplitude of each frequency band with adjusters 3a, 3b, 3c and re-combining in a summer 4 to produce a compensated output waveform fed to the source 5 of the secondary vibrations.

FIG. 1 shows a case where the primary vibrations (P) are noise travelling in a gas-filled duct D, but the principle applies equally to free-space noise transmissions, or vibrations transmitted through solid bodies.

According to one aspect of the invention a method for cancelling vibrations comprises sensing the residual vibrations resulting from interference between primary vibrations from a source of vibrations and secondary vibrations from a driven actuator, transforming the sensed residual vibrations into a plurality of independent pairs of components which together define the residual vibrations at a plurality of different locations in the frequency domain, separately modifying said independent components representative of each different frequency domain location, transforming the independent pairs of components back into a drive signal for the actuator and controlling the separate modification of the independent pairs of components to reduce the power or amplitude of the residual vibrations.

The independent pairs of components defining the residual vibrations at each of the different locations in the frequency domain can be the amplitudes of the real and imaginary sinusoidal components or the amplitude of the real sinusoidal component and a phase component.

Applying the method of the invention to the cancellation of repetitive primary vibrations it is possible to synchronise the defining pairs of components for each frequency location to the fundamental frequency of the repetitive primary vibrations.

Where the fundamental frequency of the repetitive primary vibrations is not expected to change (e.g. when cancelling noise from a constant speed engine) the different frequencies are desirably the first "n" harmonics (e.g. the second, third etc., harmonics up to (say) the fifth or better the tenth harmonic) of the fundamental frequency. Where the fundamental frequency may change (e.g. when cancelling noise from a vehicle engine) it may be better to choose a larger number of frequencies, the lowest of which will represent the lowest expected fundamental and the highest of which will represent the "nth" harmonic corresponding to the highest anticipated fundamental.

The method of the invention differs fundamentally from the unsuccessful earlier attempts, in two ways:

1. In the case of cancelling repetitive vibrations some means of synchronisation is employed in order to maintain each different frequency component locked to the repetition rate of the source (e.g. the rate of rotation of a piece of machinery).

2. A transform method is used to quantify each of the pair of components at each selected frequency location and the magnitude of these components can then be controlled independently, and in an adaptive manner.

The Fourier transform is a convenient reversible transform for employment in the invention since time waveforms and frequency spectra can be interchanged without introducing any modification. Thus, a time waveform can be re-constructed from the transformed frequency components, unlike the former filter approach shown in FIG. 1.

Since each frequency component of the residual vibrations (the error signal) can only cause a response at the same frequency (although there may be inter-action between the in-phase and quadrature components), there is a unique relationship between any change in any given frequency component of the secondary vibrations and the resulting change in the amplitude of the same frequency component of the residual vibrations.

The virtually uncontrollable phase characteristics of the early analogue filter frequency domain systems and also the need in the time domain system described in the aforementioned UK Patent Specification to use a delay which was a compromise between the different phase shifts at different frequencies, are completely eliminated by the method of the present invention. This results from its ability to separate out the frequency components in terms, for example, of the real and imaginary components of amplitude for each frequency of interest. Each of these components can be cancelled separately without interaction. Furthermore, the minimum time required for the system to adapt itself to optimum cancellation is only a few cycles of the fundamental frequency of the primary repetitive vibrations in the case of the cancellation of such repetitive vibrations.

Suppose a modification made to the waveform of a cancelling vibration from the actuator at a particular frequency comprises sine and cosine components. Then if a is the amplitude of the sine component,
b is the amplitude of the cosine component, and
C is the change in cancelling component, we have $$C = a + jb$$

The resulting change in the residual (or error) signal can then also be expressed as the sum of two different amplitude components, by the relationship $$R = m + jn$$

where
m = the amplitude of the sine component, and
n = the amplitude of the cosine component.

From this it follows that the transfer function (F) between the actuator and the means sensing the residual vibrations (residual sensor) at that frequency is:

$$F = \frac{\text{cancelling signal}}{\text{residual signal}} = \frac{a + jb}{m + jn}$$

and will be a constant for a given physical configuation with a given actuator and a given residual sensor.

Thus, in order to calculate the required signal to cancel a different measured residual signal of (p+jq), the same transfer function can be employed.

(Equation A.)

i.e. $F = \frac{a + jb}{m + jn} = \frac{\text{required drive for the actuator}}{p + jq}$ i.e. Required drive =

$$\frac{p(am + bn) + q(an - bm) + j[p(bm - an) + q(am + bn)]}{m^2 + n^2}$$

It follows, therefore, that any change made to the cancelling component can be used to calculate the transfer coefficients between the actuator and the residual sensor. These transfer coefficients can then be used in the next iteration of a cancellation algorithm to effect a close approximation to the cancellation required to produce a null at the residual sensor. A variety of algorithms can be used in the method of the invention to produce a very rapid approach to substantially complete cancellation. For example, when each modification is made, the transfer coefficients could be recalculated and the next calculation made on this new calculated value. A second possibility is to use the difference between the original, cancellation coefficient and the current coefficient to calculate the new transfer coefficient.

According to a further aspect of the invention, apparatus for cancelling vibrations entering a given location from a source of vibrations comprising a first electromechanical transducer to monitor the primary vibrations approaching said given location, a second electromechanical transducer to generate a secondary vibration and to feed the same to said location, a third electro-mechanical transducer to monitor the resultant vibrations existing at said location due to interaction therebetween said primary and secondary vibrations and an electronic processing circuit linking said first, second and third transducers, which is characterised in that said processing circuit includes first and third transform modules, respectively receiving time waveform samples from the first and third transducers and generating respective independent pairs of components at each of a plurality of different locations in the frequency domain which uniquely represent the respective time waveform samples, a processor for separately modifying the components of each independent pair of components outputting from the first and third transform modules and feeding the modified pairs of components to a second transform module, said second transform module generating further time waveform samples, and means to feed the output of the second transform module to the second transducer.

According to a still further aspect of the invention, apparatus for cancelling vibrations entering a given location from a source of repetitive vibrations comprises means to monitor the repetition rate at which the source is emitted said vibrations, a first electro-mechanical transducer to generate a secondary vibration and to feed the same to said location, a second electro-mechanical transducer to monitor the resultant vibrations existing at said location due to interaction therebetween said primary and secondary vibrations, and an electronic processing circuit linking said first and second transducers, which circuit includes synchronising means receiving an electrical signal train from said rate monitoring means, and is characterised in that said processing circuit linking said second and first transducers includes a first transform module receiving time waveform samples from the second transducer and generating independent pairs of components at each of a plurality of different frequency locations of the time waveform samples, a processor for separately modifying the independent pairs at each said frequency location outputting from the first transform module and feeding the modified pairs of components to a second transform module, said second transform module generating further time waveform samples which are fed as input to the first transducer.

The transform modules could be Fourier transformers or some other transform module which produces mutually independent components from a plurality of time domain samples.

The transform modules can be implemented in analogue or digital form.

Figure 2:
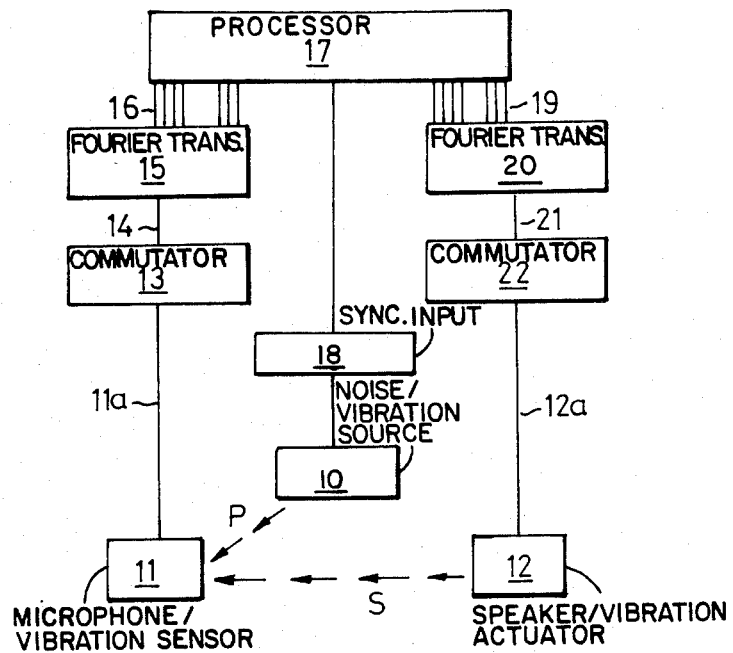
Figure 6:
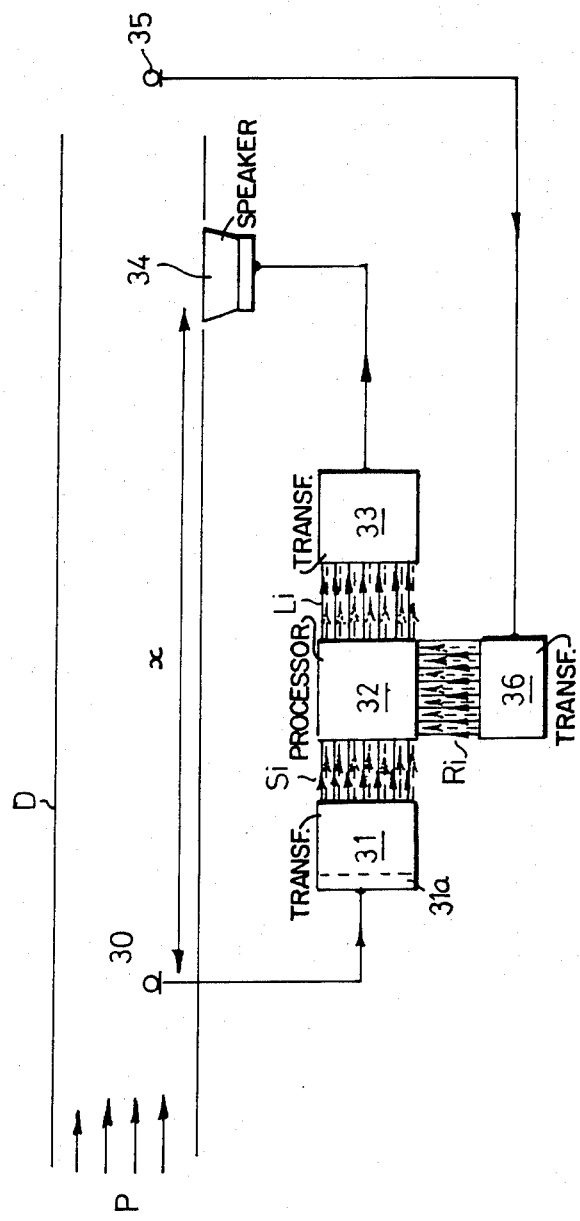

The invention will now be further described, by way of example, with reference to the accompanying drawings, in which:

FIG. 1 is a schematic view of the prior art system already discussed,

FIG. 2 is a schematic block diagram of an apparatus according to the invention for the active cancellation of repetitive noise from a machine, FIG. 3 shows a schematic of part of the feedback loop of the apparatus of FIG. 2, FIG. 4 shows how the effect of non-synchronised noise from a residual sensor can be reduced, FIG. 5 shows a possible analogue implementation of a Fourier transformer for use in the method and apparatus of the invention, and FIG. 6 is a schematic block diagram of an apparatus according to the invention for the active cancellation of random noise in a duct.

Referring to FIG. 2, a machine 10 (e.g. a reciprocal linear machine or a rotating engine) generates primary vibrations P to the location of an electro-mechanical transducer or null sensor 11 (e.g. a microphone). A further electro-mechanical transducer or actuator 12 (e.g. a loudspeaker) generates secondary vibrations S which interact with the primary vibrations P in the location of the null sensor 11.

The electrical output from the null sensor 11 is fed (via line 11a) to a commutator 13 to provide an analogue input 14 to a first Fourier transformer 15. A plurality of outputs 16 from the transformer 15, feed signals to a processor 17, which receives synchronising pulses from the machine 10, via a synchronisation input 18. In the processor 17, the signals on the outputs 16 are adapted, as described hereafter, to provide modified outputs 19 which provide the inputs to a second Fourier transformer 20. The analogue output 21 from the transformer 20 is fed to a commutator/driver 22 and thence (via line 12a) to the actuator 12.

FIG. 3 shows part of the apparatus of FIG. 2 in greater detail. The time waveform on the line 11a is sampled into a series of registers, by the commutator 13, these registers forming the input to the Fourier transformer 15. The outputs are:

$$S_n = \sum_j I_j \sin(2 \cdot pi \cdot n \cdot j/W)$$

where $S_n$ is the amplitude of the "nt" harmonic and W=the total number of elements in the storage system. The outputs 16 and 19 in FIG. 3 have been shown in pairs, one in solid line to show the real (or sine) component of that frequency and the other dashed to show the imaginary (or cosine) component of the same frequency.

The individual harmonic components at each of the "n" frequencies are then processed in the processor 17 according to an adaptive algorithm (e.g. such as that shown earlier in equation A) and are presented to the second Fourier transformer 20 which converts the frequency domain samples back into time waveform samples, one on each part of the output 21. These samples of the acquired time waveform are, of course, presented in synchronism with the operation of the machine 10 and are combined in the commutator/driver 22 to feed the line 12a.

The apparatus described so far does not enjoy the same advantages of noise immunity as some of the time domain system previously developed. This deficiency can, however, be corrected by averaging the residual signals on the line 11a over a number of repeat cycles of the machine 10 prior to calculating the transfer coefficients and thus prior to determining the adaption operations to be performed in the processor 17. This can be effected with the arrangement shown in FIG. 4 which employs one residual waveform storage unit 23 for each time slot used by the commutator 13, so that it contains at any one time the accumulation of a fixed number of immediately previous residual samples in that time slot. Alternatively the waveform storage area could contain an exponentially averaged version of the residual waveform. In both these cases the residual waveform storage system would act as a comb filter on the residual waveform.

The Fourier transformer could be implemented in software, as a computer programme (see "The Fast Fourier Transformer"—E. Oran Brigham—Prentice Hall), or in digital hardware emulating the Fourier transformer or "fast Fourier transform" computer programmes or in analogue hardware, one example of which is shown in FIG. 5.

FIg. 5 shows a schematic part of a cross-coupled array of resistors linking vertical grid conductor (one for each of the time samples $t_o, t_1, t_2 \ldots t_m$) and pairs of horizontal grid conductors, two pairs for each frequency component produced by the transformer, the outputs on one pair $(S_1+, S_1-)$ being combined in a differential current summer $S_1$ to give the sine component of the first harmonic and the outputs on the next pair $(C_1+, C_1-)$ being combined in a second summer $C_1$ to give the cosine (or quadrature) component of the first harmonic. Further pairs of pairs are required for each subsequent harmonic, but only those for the sine component of the nth harmonic have been shown leading to a differential current summer $S_n$. The outputs 16 from the transformer 15 have been shown in solid and dashed lines as in FIG. 2.

The locations of the resistors used for each cross coupling are only schematically illustrated in FIG. 5 but are located and sized to provide a current proportionally to the sine (or cosine) of the respective harmonic.

Referring to FIG. 6, random noise P in a duct D is sensed by a microphone 30, transformed by a Fourier transformer 31 to produce complex frequency domain samples S(i) which are multiplied in a process unit 32 by complex coefficients efficients C(i) before being inversely transformed by a transformer 33 and then passed to a cancelling loudspeaker 34. The residual, uncancelled, noise passes down the duct to a residual microphone 35 which may in the limit be positioned in the centre of the duct above the loudspeaker 34 or at any other position where a sound null is required. The signal from the microphone 35 is transformed by a unit 36 and passed to the processing unit 32 where the coefficients are multiplied by the inverse of the transfer function 34→35 (F(L→R)), thus generating the frequency domain components required at the loudspeaker 34 to produce the measured residual at the microphone 35. The following relationships apply:

$$S(i) \times C(i) = L(i)$$

S(i)=frequency domain component at time (i) from the transformer 31.
C(i)=multiplying coefficient of the processor unit 32.
L(i)=frequency domain coefficient being transferred to the loudspeaker 34.

This signal L(i) results in a residual R(i), requiring an additional loudspeaker drive signal $$\frac{R(i)}{F(L \to R)}$$

Hence, the new coefficient of the frequency domain sample being considered $$C(i+1) = C(i) + \frac{R(i)}{F(L \to R)} \times \frac{1}{S(i)}$$

Alternatively, heuristic adjustment of each frequency domain component could be undertaken independently—either sequentially or in parallel.

The simplest algorithm for adaption is successive trial and error, making incremental changes to the cancelling parameters to minimise the relevant power function at the residual measuring point. When transformed parameters are available, adaption of each component frequency can occur simultaneously.

A faster adaption technique uses the amplitude of the residual signal to predict the modification needed to fully compensate for the residual error measured, rather than approach the adapted state by increments as in the heuristic adaption case discussed above. Chaplin III assumes a simple delay function between the cancellation output signal through the transducer and residual sensor to the cancellation residual input terminals.

Assuming the transfer between cancelling transducer and residual sensor is known or can be measured, it is a relatively simple computation to predict the required frequency domain parameter to provide cancellation by any measured residual.

In the case of broadband random noise, the Fourier spectrum is continuous and it is known that precautions must be taken to avoid spurious effects caused by the discontinuities at the ends of the sampling period. For example, a raised cosine window function can be applied to the time samples to reduce the contributions at the two ends of the sample period, where the discontinuities would otherwise occur, to zero.

When applied to direct noises the situation is illustrated in FIG. 6. The sensing microphone signal passes into the transform unit 31 and will take a time T to propagate through the input sampling shift register 31a (whose taps form the time sample for the transformer). T is defined by 1/F where F is the lowest cancellation frequency and in general, the time delay caused by the separation x between the noise sensor 30 and the cancelling loudspeaker 34 should exceed this time period T.

The Fourier discrete transform coefficients are then multiplied by coefficients stored in the processing unit 32 which update the multiplying coefficients from time to time. The resulting coefficients are applied to the inverse transformer L33, (which could be a partial implementation only if transformation sampling is carried out more rapidly than once very 1/F seconds, since only one or a few output samples would be required per transform calculation).

The updating of the multiplying coefficients can be performed as follows:

1. Each of the following operations is performed either sequentially or in parallel on each of the frequency components in the discrete Fourier transform spectrum.

2. The loudspeaker-residual transfer function is measured or pre-stored as $F(L \rightarrow R)$.

Then it is known that a frequency component of complex amplitude A on the loudspeaker 34 will produce a residual signal $A.F(L \rightarrow R)$.

Hence a measured residual signal $R(i)$ will require a loudspeaker signal of $$\frac{R(i)}{F(L \rightarrow R)}$$

Now, the current multiplying coefficient $C(i)$, was operating on a sensing microphone frequency coefficient $S(i)$. To increase the loudspeaker signal by $R(i)/F(L \rightarrow R)$ the coefficient should have been $C(i)(1+R(i)/F(R) \times S(i)$. The processing element would update the stored coefficient to this new value, once per iteration.

It should be noted that:

1. If the transmission path $34 \rightarrow 35$ involves a substantial propagation delay, it will be necessary to sample the frequency domain signal elements $S(i)$ and use the sample at a later time i.e. the delay time later, for updating the coefficients in the unit 32.

2. High Q resonances in the duct D would require a large number of samples in the frequency domain since the slow build-up of the resonances can only be represented by closely spaced frequency domain samples.

The transfer function between the actuator 12, 34 and residual sensor 11, 36 can be deduced in a number of ways. For example, a series of tones can be presented to the actuator and the resulting in-phase and quadrature components measured at the residual sensor, or an impulse can be presented to the actuator, Fourier analysed and the relationship between the in-phase and quadrature components of the source related to the in-phase and quadrature components at the residual sensor or a sample of random noise could be similarly processed. Any of these techniques will yield the amplitude and phase response between actuator and the residual sensor which can be used to infer the demanded signal at the actuator for cancelling any measured residual signal.

The transformation from time domain to frequency samples requires a time history of the waveform to undergo a matrix multiplication by samples of the sinusoidal and cosinusoidal waveforms, or a mathematically equivalent operation (e.g. the first Fourier transformed). The transformation is reversible, and the original time waveform can be restored by an inverse transform, which process differs only slightly from the Fourier transform.

Where the method of the invention is applied to multiple interacting systems, two approaches are preferred:

(a) The characterisation of each actuator-residual path is performed in a quiet or stable environment and the systems are then allowed to settle to their final level by process of iteration—each actuator attempting to null its own residual sensor. This process has been found quite effective even in situations with considerable interaction, providing the residual sensor most sensitive to its appropriate actuator is connected in the feedback loop, or (b) by pre-measuring the cross-coupling coefficients between each actuator and residual sensor and performing the matrix operations in a single processor to deduce the required cancellation signal on each cancelling actuator. Such a system has the advantage of rapid adaption (since no iteration is needed) but is less modular than (a) above.

Time domain sampling at a rate faster than is necessary for providing the requisite number of frequency domain samples will, in many cases of random vibrations, be advantageous since the multiple frequency domain samples of each time domain section of waveform will effectively generate a rolling phase of the frequency components, thus interpolating between the frequency domain samples.

The method and apparatus of the invention would be particularly suited to, although not limited to, any situation in which it is not possible to achieve a "suitable" phase response between a cancellation actuator and a residual sensor. A "suitable" phase response corresponds to a pure time delay for the previous fast adapting system. However, its application is not limited to this type of actuator/acoustic/sensor response, it could also be applied to other more well behaved actuators. Examples of systems with poor phase response include in-cab and in-room acoustics, vibration in structures and vibration in vessels and aircraft, and the invention shows particular promise in these applications.

We claim:

1. A method of cancelling repetitive vibrations comprising sensing the residual vibrations resulting from interference between primary vibrations from a source of repetitive vibrations and secondary vibrations from a driven actuator, transforming the sensed residual vibrations into a plurality of independent pairs of components which together define the residual vibrations at a plurality of different locations in the transformed domain, each synchronised to the repeat period of the repetitive primary vibrations from the source, separately modifying each component of each pair of components, transforming the said independent pairs of components back into a drive signal for the actuator and controlling the separate modification of the components of the pairs of components to reduce the power or amplitude of the residual vibrations.

2. A method as claimed in claim 1, in which the independent pairs of components defining the residual vibrations at each of the different locations in the transformed domain are the amplitudes of the real and imaginary sinusoidal components or the amplitude of the real sinusoidal component and a phase component.

3. A method as claimed in claim 1, in which the locations are in the frequency domain and include the fundamental frequency of the repetitive vibrations and at least some of the lowest harmonics thereof.

4. A method as claimed in claim 3, in which the fundamental and substantially all the first five harmonics are included.

5. A method as claimed in claim 1, in which a set of time domain samples of the residual vibrations is Fourier transformed into independent pairs of components in the frequency domain.

6. Apparatus for cancelling vibrations entering a given location from a source of repetitive vibrations comprising means to monitor the repetition rate at which the source is emitting said vibrations, a first electro-mechanical transducer to generate a secondary vibration and to feed the same to said location, a second electro-mechanical transducer to monitor the resultant vibrations existing at said location due to interaction there between said primary and secondary vibrations, and an electronic processing circuit linking said first and second transducers, which circuit includes synchronizing means receiving an electrical signal train from said rate monitoring means, characterized in that said processing circuit linking said second and first transducers includes a first transform module receiving time waveform samples from the second transducer and generating independent pairs of components at each of a plurality of different locations in a transformed domain, a processor for separately modifying the independent pairs at each said location in the transformed domain outputting from the first transform module and feeding the modified pairs of components to a second transform module, said second transform module generating further time waveform samples which are fed as input to the first transducer.

7. Apparatus as claimed in claim 6, in which each transform module is a Fourier transformer.

* * * * *